US012686620B2

(12) United States Patent
Wu et al.

(10) Patent No.: US 12,686,620 B2
(45) Date of Patent: Jul. 21, 2026

(54) NEAR INFRARED TRANSMITTING COPPER OXIDE NANOPARTICLES

(71) Applicant: Toyota Motor Engineering & Manufacturing North America, Inc., Plano, TX (US)

(72) Inventors: Songtao Wu, Ann Arbor, MI (US); Debasish Banerjee, Ann Arbor, MI (US); Krishna Gunugunuri, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 720 days.

(21) Appl. No.: 16/929,414

(22) Filed: Jul. 15, 2020

(65) Prior Publication Data

US 2022/0017379 A1     Jan. 20, 2022

(51) Int. Cl.
*C01G 3/02*     (2006.01)
*C09C 1/62*     (2006.01)
(Continued)

(52) U.S. Cl.
CPC ................ *C01G 3/02* (2013.01); *C09C 1/627* (2013.01); *C09C 3/041* (2013.01); *C09C 3/043* (2013.01);
(Continued)

(58) Field of Classification Search
CPC .......... B82Y 30/00; B82Y 40/00; C01G 3/02; C01P 2002/60; C01P 2002/74; C01P 2002/82;

C01P 2002/84; C01P 2004/01; C01P 2004/04; C01P 2004/32; C01P 2004/61; C01P 2004/62; C01P 2004/64;
(Continued)

(56) References Cited

U.S. PATENT DOCUMENTS 9,683,107 B2     6/2017  Milliken et al.
2011/0172085 A1     7/2011  Wolk et al.
(Continued)

FOREIGN PATENT DOCUMENTS

CN     101273723 A     10/2008
CN     104271676 A     1/2015
(Continued)

OTHER PUBLICATIONS

International Search Report and Written Opinion for application PCT/US2021/041571 mail date Oct. 15, 2021 (14 pages).
(Continued)

*Primary Examiner* — Shuangyi Abu Ali
(74) *Attorney, Agent, or Firm* — DINSMORE & SHOHL LLP

(57)     ABSTRACT

A black IR reflective or transmissive pigment from which LiDAR responsive black coatings can be formed where the pigment displays a Blackness $M_y$ value similar to non-IR reflective carbon black. The CuO particles display small crystallites of less than 18 nm and an (−111)/(111) reflectance intensity ratio of less than 1.2. A method of forming the CuO particles includes precipitation of CuCO3 or $CuCO_3/Cu(OH)_2$ using an alkali carbonate as a precipitant and calcining the precipitate at about 300° C. to about 400° C.

22 Claims, 8 Drawing Sheets

(51) Int. Cl.

| | |
|---|---|
| *C09C 3/04* | (2006.01) |
| *C09D 5/33* | (2006.01) |
| *C09D 7/40* | (2018.01) |
| *C09D 7/61* | (2018.01) |
| *B82Y 30/00* | (2011.01) |
| *B82Y 40/00* | (2011.01) |

(52) U.S. Cl.
CPC .............. *C09D 5/004* (2013.01); *C09D 7/61* (2018.01); *C09D 7/67* (2018.01); *B82Y 30/00* (2013.01); *B82Y 40/00* (2013.01); *C01P 2002/60* (2013.01); *C01P 2004/61* (2013.01)

(58) Field of Classification Search
CPC ............ C01P 2006/40; C01P 2006/60; C08K 2003/2248; C08K 2201/005; C09C 1/00; C09C 1/28; C09C 1/405; C09C 1/407; C09C 1/627; C09C 3/041; C09C 3/043; C09C 3/063; C09D 5/004; C09D 7/61; C09D 7/67; G01S 17/931
See application file for complete search history.

(56) References Cited

U.S. PATENT DOCUMENTS

| | | | |
|---|---|---|---|
| 2015/0122146 A1* | 5/2015 | Gruner ................. | C09D 5/1618 427/383.1 |
| 2017/0015836 A1 | 1/2017 | Milliken et al. | |

FOREIGN PATENT DOCUMENTS

| | | | |
|---|---|---|---|
| CN | 103480377 | B | 4/2015 |
| CN | 106164185 | A | 11/2016 |
| JP | 2023502794 | A | 1/2023 |
| WO | 2014070116 | A1 | 5/2014 |

OTHER PUBLICATIONS

Braga et al: "Copper oxide and niobium pentoxide supported on silica-alumina: Synthesis, characterization, and application on diesel soot oxidation", Journal of Catalysis, Academic Press, Duluth, MN, US, vol. 247, No. 1, Mar. 2, 2007 (Mar. 2, 2007), pp. 68-77, XP005907307, ISSN: 0021-9517, DOI: 10.1016/J.JCAT.2006.12.022.

Akgul Funda Aksoy et al: "Influence of thermal annealing on microstructural, morphological, optical properties and surface electronic structure of copper oxide thin films", Materials Chemistry and Physics, vol. 147, No. 3, Oct. 1, 2014 (Oct. 1, 2014), pp. 987-995, XP055846533, Switzerland, Taiwan, Republic of China ISSN: 0254-0584, DOI: 10.1016/j.matchemphys.2014.06.047.

Ray S Ced—Espinosa Nieves et al: "Preparation of copper oxide thin film by the sol-gel-like dip technique and study of their structural and optical properties", Solar Energy Materials and Solar Cells, Elsevier Science Publishers, Amsterdam, NL, vol. 68, No. 3-4, Jun. 1, 2001 (Jun. 1, 2001), pp. 307-312, XP004230572, ISSN: 0927-0248, DOI: 10.1016/S0927-0248(00)00364-0.

Tangale Nilesh Pet al: "Dehydrogenation of cyclohexanol over Cu/Al2O3catalysts prepared with different precipitating agents", Applied Catalysis A: General, Elsevier, Amsterdam, NL, vol. 467, Aug. 18, 2013 (Aug. 18, 2013), pp. 421-429, XP028758172, ISSN: 0926-860X, DOI: 10.1016/J.APCATA.2013.07.063.

Zhang Fan et al: "Effect of Al-containing precursors on Cu/ZnO/Al2O3 catalyst for methanol production", Fuel Processing Technology, vol. 178, Sep. 1, 2018 (Sep. 1, 2018), pp. 148-155, XP055847608, NL ISSN: 0378-3820, DOI: 10.1016/j.fuproc.2018.04.021.

Wu Songtao et al: "Pitch-Black Nanostructured Copper Oxide as an Alternative to Carbon Black for Autonomous Environments", Advanced Intelligent Systems, vol. 3, No. 9, Jun. 29, 2021 (Jun. 29, 2021), p. 2100049, XP055846672, DE ISSN: 2640-4567, DOI: 10.1002/aisy.202100049 Retrieved from the Internet: URL: https: //onlinelibrary.wiley.com/doi/full-xml/10.1002/aisy.202100049>.

Chinese Office Action for Application No. 202180049246.6 dated Apr. 19, 2025 (12 pages with English translation).

Office Action issued Sep. 16, 2025, in Japanese Patent Application No. 2023502794, filed Nov. 19, 2020, 7 pages.

Office Action issued Sep. 19, 2025, in Chinese Patent Application No. 202180049246.6, filed Jul. 14, 2021, 15 pages.

Rachi Takeshi et al., "Darkening of pigments for high solar reflectance paints by supporting CuO nanoparticles," Kanagawa Institute of Industrial Science and Technology Research Report, No. 23, pp. 33-34, 2017. Available: https://www.kistec.jp/kistec-manage/wp-content/uploads/2017_annl_rprt_p33.pdf.

Kim, J.H. et al., "Design of Near Infrared Reflective Effective Pigment for LiDAR Detectable Paint," MRS Advances, vol. 5, Issue 11 (Energy and Environment), Jan. 21, 2020, pp. 515-522 (Abstract only).

* cited by examiner

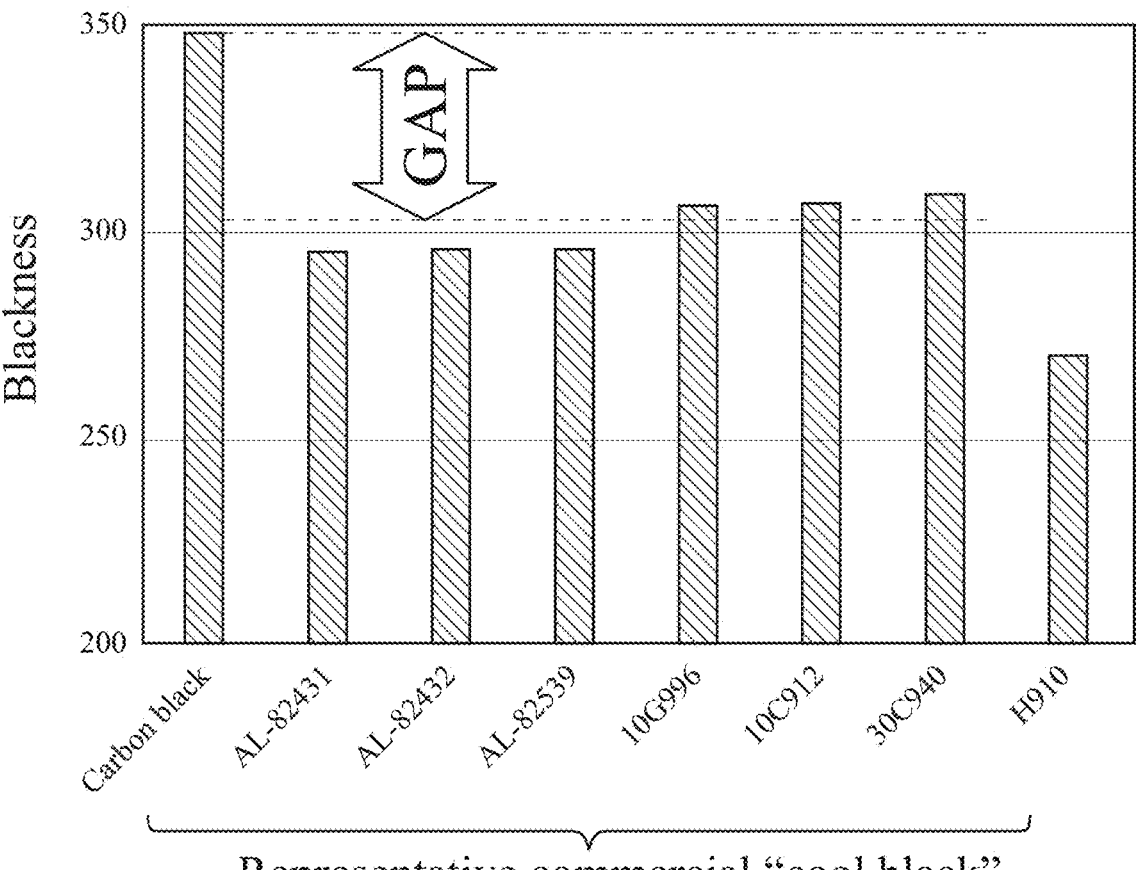
FIG. 3
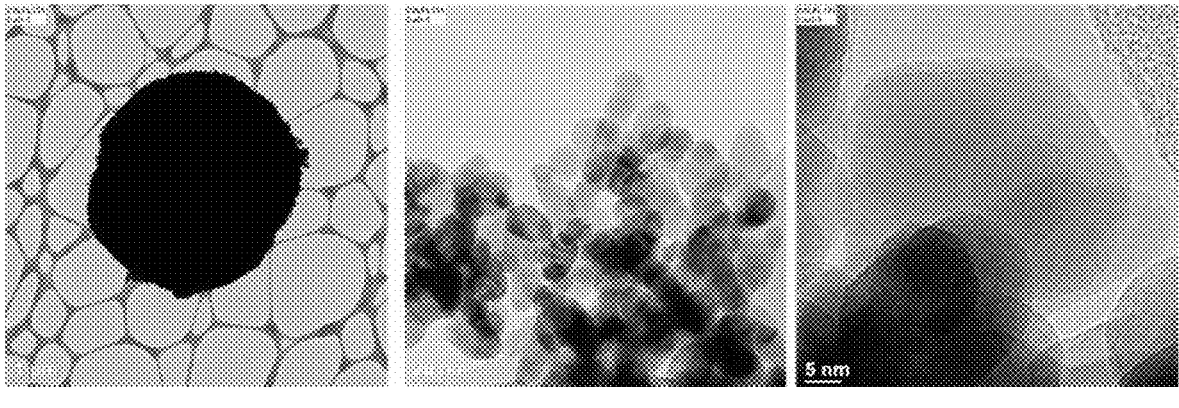
FIG. 4A      FIG. 4B      FIG. 4C

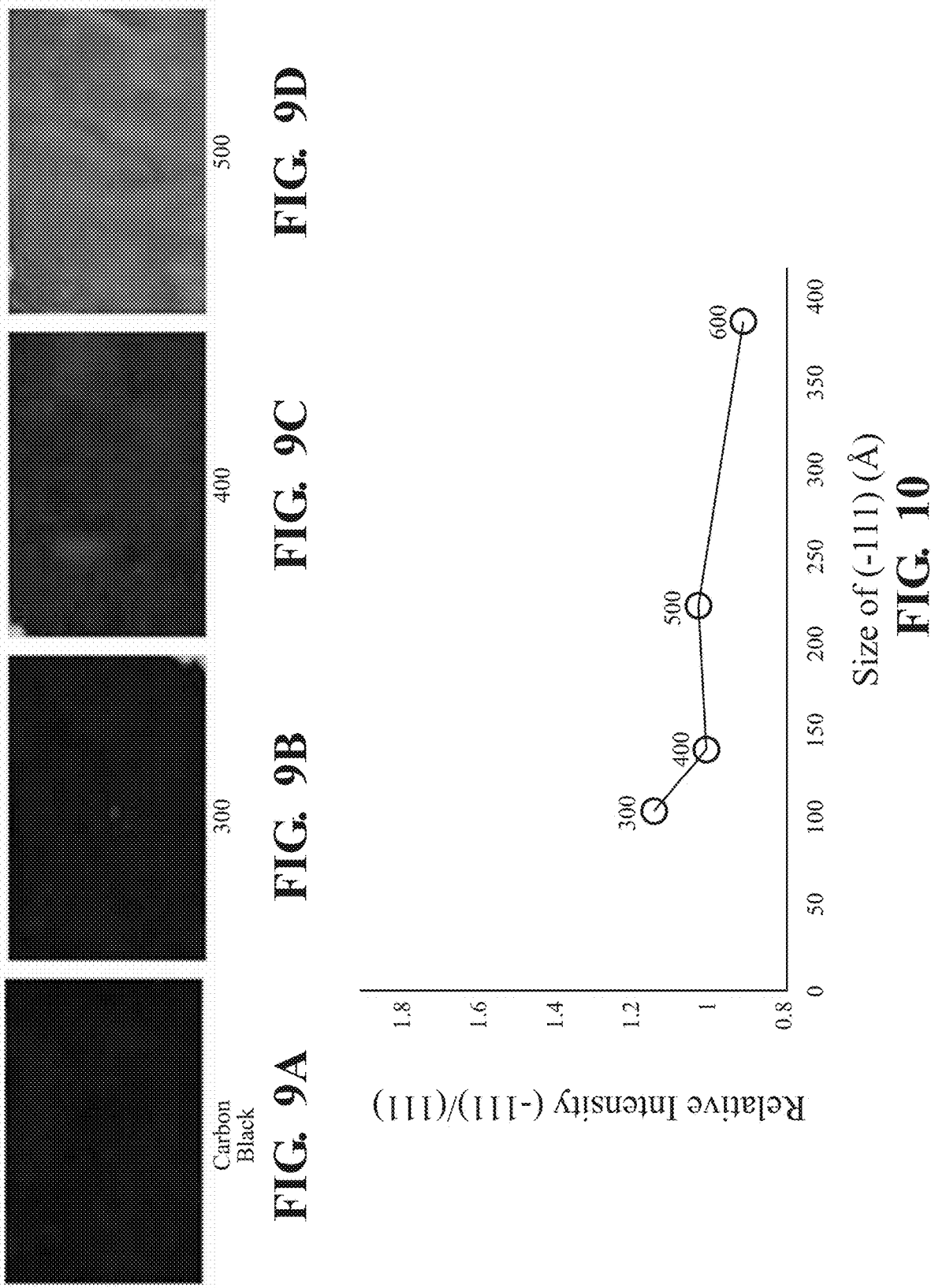

NEAR INFRARED TRANSMITTING COPPER OXIDE NANOPARTICLES

TECHNICAL FIELD

The present disclosure generally relates to copper oxide-based pigments and pigment compositions for coating formulations that are characterized by near infrared transmission and/or reflectance for use in near IR light detection and ranging (LiDAR) applications.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

LiDAR light in the near IR, typically 905 nm or 1550 nm, is used to detect objects by autonomous vehicles. As illustrated in FIG. 1, white and many other colors display near IR reflectance, while traditional black pigments used in paints and coatings, generally based on carbon black, absorb the near IR frequencies. This generally renders objects having a coating with a traditional black pigment effectively invisible to the LiDAR sensors. The use of black and dark paints on vehicles and other objects that are commonly encountered in traffic, which reflect the near-IR in the manner illustrated in FIG. 2, is desirable in the development of self-driving vehicles. Currently available dark near IR reflective pigments based on chromium iron oxide (and its derivatives) do not achieve the aesthetics of currently available black vehicle coatings, as indicated in FIG. 3. Improved black pigments are needed.

The use of copper (II) oxide (CuO) has been explored as a black pigment, having been used as a dark pigment for ceramic glazes. Coating pigments generally require uniform particles of less than 3 microns. CuO powders display different morphologies and properties depending upon their method of preparation. Generally, commercial methods do not provide CuO particles that are readily useful as pigments for coatings, as these methods produce large particles or agglomerates of fine particles. Typical precipitation methods provide CuO with average particle sizes greater than 10 microns, although particles of less than 10 microns with narrow particle distribution of less than three have been prepared by milling. For example, U.S. Pat. No. 9,683,107 is directed to an infrared reflective "black" pigment prepared by heating in excess of 480° C. and milling at least 99% pure CuO to generate particles of about 1 to 3 microns with crystallite sizes of more than 19 nm, though with a CIE-LAB values of about 28, 0.5 and –0.3, the "black" pigment is rather brown in appearance.

To carry out LiDAR applications, a band gap of about 1.2 eV to 1.7 eV with band edge less than 700 nm (or 1.77 eV) is needed to absorb the visible spectrum and transmit LiDAR active near IR wavelengths. Without manipulation, typical bulk CuO has a bandgap out of 1.3 eV to 1.7 eV and a band edge more than 1.77 eV and cannot meet this requirement. There is a need to have CuO pigment of appropriate dimensions and composition that display a blackness near that of carbon black and is configured to selectively reflect near IR radiation, particularly at the 905 nm and/or 1550 nm wavelengths that are employed for object detection by autonomous vehicles using LiDAR technology.

SUMMARY

This section provides a general summary of the disclosure and is not a comprehensive disclosure of its full scope or all features.

In various aspects, the present teachings provide a black pigment including near IR transmitting and/or reflecting particles having CuO on at least a portion of an outer surface of the particles. The particles have crystal sizes of less than about 15 nm, and the relative intensity of the (−111)/(111) planes by X-ray diffraction analysis (XRD) is about 1.2 or less. The particles can have a diameter of less than about 10 nm to greater than about 10 μm. The particles enable the reflectance of LiDAR radiation at 905 nm and/or 1550 nm for object detection and display a bandgap of 1.2 to 1.7 eV and a Blackness $M_y$ value of at least about 132.

In other aspects, the present teachings provide a coating composition that includes a fluid medium with the black pigment that includes the near IR transmitting and/or reflecting particles having CuO disposed on at least a portion of an outer surface of the particles. The coating composition can be used as a black paint or coating.

In still other aspects, the present teachings provide a method to prepare the near IR transmitting and/or reflecting particles having CuO on at least a surface of the particles. The method involves the formation and precipitation of $CuCO_3$ or $CuCO_3/Cu(OH)_2$ from aqueous solution by the reaction of an alkali metal carbonate with a water-soluble copper (II) salt. When the aqueous solution has suspended particles, either nanoparticles or microparticles, the precipitation can be accompanied by the deposition of the $CuCO_3$ onto supporting particles. The supporting particles can be a core particle of the CuO including particle and can have a cross section of less than 300 nm through a cross section that is larger than 1.5 μM. When the deposition is on a particle of another composition, the CuO portion of the particle is 50 nm or less. The $CuCO_3/Cu(OH)_2$ formed nanoparticles or microparticles are washed, filtered, dried, and calcined to temperatures between about 300 and 400° C.

In still further aspects, the present teachings provide a black paint for application on exterior surfaces of vehicles, or other objects, to enable their detection by LiDAR technology. For example, LiDAR technology can assist various functions of autonomous vehicles by detecting a reflectance of the 905 nm and/or 1550 nm wavelengths transmitted from near IR lasers for LiDAR technology. The black pigment of the present technology can exhibit Blackness $M_y$ value of at least about 132, which gives the aesthetic qualities of carbon black pigments, and also provides good reflection of infrared radiation.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 3 shows a graph of the "blackness" of current automotive standard carbon black pigments and various commercially available chromium iron oxide based near IR reflective pigments.

FIGS. 4A-4C show transmission electron microscopy photos of IR reflective CuO particles, according to an aspect of the present technology, where an aggregate particle of more than 6 µm (FIG. 4A), is aggregated particles of less than about 40 nm (FIG. 4B), and primarily particles of about 20 nm (FIG. 4C).

FIGS. 9A-9D are photographs of different ground pigments from left to right: carbon black (FIG. 9A); 300° C. calcined $Na_2CO_3$ precipitated CuO, according to an aspect of the present technology (FIG. 9B); 400° C. calcined $Na_2CO_3$ precipitated CuO, according to an aspect of the present technology (FIG. 9C); and 500° C. calcined $Na_2CO_3$ precipitated CuO (FIG. 9D).

FIG. 10 is a plot of the (−111)/(111) relative intensities vs. crystallite sizes for $Na_2CO_3$ precipitated CuO that are calcined at 300, 400, 500 and 600° C. temperatures.

Figure 2:
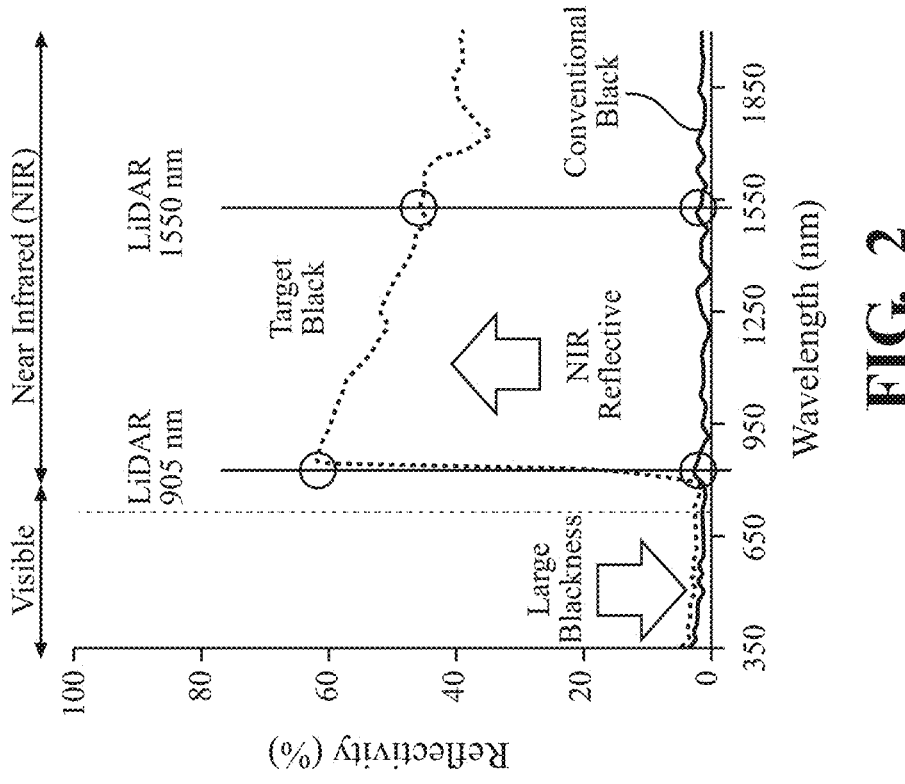
FIG. 2 shows a plot of the reflectivity of targeted IR reflective black paints vs. current black paints, where the target is to achieve a blackness like the current paints but achieve reflectivity in the near IR at 905 and/or 1550 nm
Figure 1:
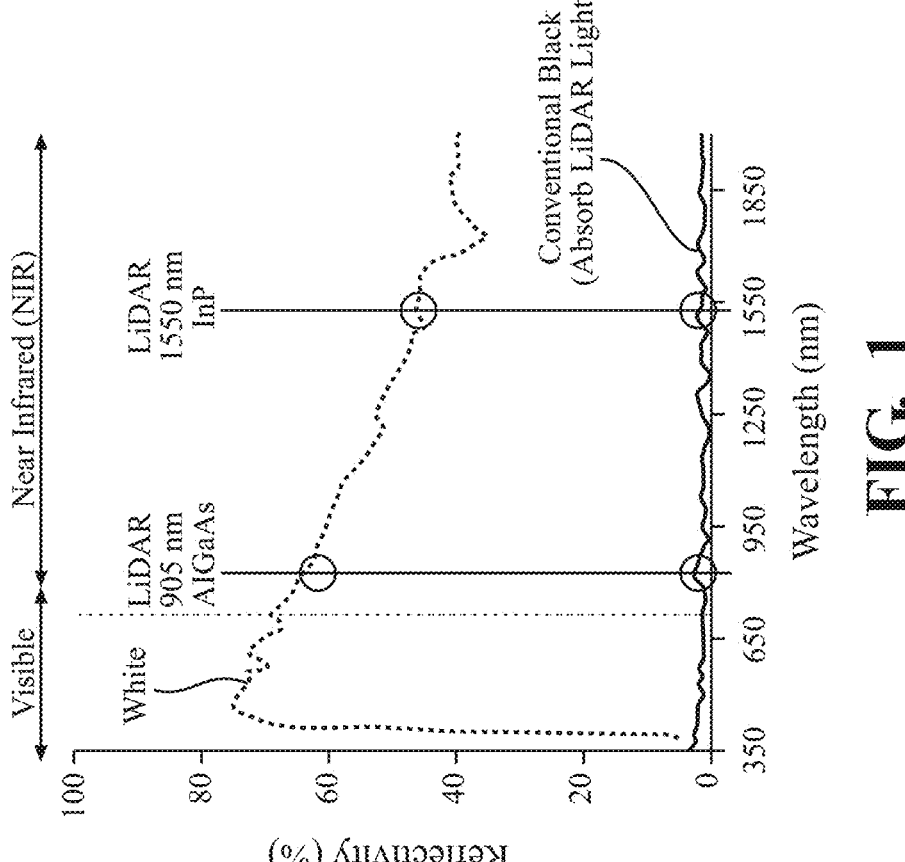
FIG. 1 shows a plot of the reflectivity of current white and black paints used for vehicles illustrating that the reflectivity of near IR is insufficient for conventional black paints based on carbon black.

It should be noted that the figures set forth herein are intended to exemplify the general of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DETAILED DESCRIPTION

The presently technology generally provides black pigments that contain near IR transmitting and/or reflecting particles having CuO disposed on at least a portion of an outer (i.e., exposed) surface of the particles. The entire particle can be CuO. The CuO provides strong absorption of visible light through most of the visible spectrum but displays significant reflectance in the near IR. In various aspects, the crystal sizes, as indicated by the size of the (−111) reflection can be provided with a maximum dimension of less than about 18 nm, and the relative intensity of (−1,1,1)/(1,1,1) planes is about 1.2 or less. The particles can have a diameter dimension of less than about 40 nm. The particles enable the reflectance of LiDAR radiation at 905 nm and/or 1550 nm for object detection, and the particles display a bandgap of 1.2 to 1.7 eV and exhibit a Blackness $M_y$ value of at least about 132. The particles can have nanometer dimensions of less than 40 nm through micrometer dimensions greater than 10 µm. The small crystal size of the CuO particles provides the near IR transmittance or reflectance without significant reflection of visible light that characterizes black pigments therefrom. The reflectance of LiDAR radiation at 905 nm and/or 1550 nm can be used in detection of the particles.

In one aspect of the present technology, the black pigment is incorporated in a coating composition such that the composition retains, provides, or enhances the near IR reflection of the black pigment when applied to a surface. The black pigment can exhibit a Blackness $M_y$ value of about 132 or greater, resulting in a black coating of similar black quality to that provided by traditional black coatings based on carbon black, which are coatings that lack an ability to reflect or transmit in the IR. The coating composition may include a fluid medium for applying the black pigment at a particle loading that achieves the desired aesthetic on a desired surface. The fluid medium is preferably a fluid that permits coating by common techniques such as spraying or dip coating.

In another aspect, the present teachings provide a method to prepare the near IR transmitting and/or reflecting particles having CuO on at least the particle's surface. The method involves the formation and precipitation of $CuCO_3$ from aqueous solution by the reaction of an alkali metal carbonate with a water-soluble copper (II) salt, such as copper (II) nitrate. The precipitation can be accompanied by the deposition of the $CuCO_3$ onto supporting particles. The supporting particles can be nanoparticles of mica, synthetic mica, glass, quartz, alumina, or any other particle that enhances the reflection and/or transmittance of the IR radiation while retaining the aesthetics of the black pigment. The particles can be less than 300 nm in cross section and where the CuO portion of the particle is 50 nm or less. The particles may form as an aggregate of particles that can be milled to form the nanoparticles or aggregated nanoparticles, for example, particles of less than 300 nm. Milling can include ball milling, jet milling, or any other technique that is conducive to the formation of particles of the desired dimensions. The particles can generally be less than 300 nm or greater than 10 µm while retaining the small crystal size, for example, of about 15 nm or less.

As detailed herein, the present teachings are not only directed to the development of the black pigment in a coating composition, but are also directed to the application and use of the coating composition as a paint cured on the exterior surfaces of vehicles, or other objects, to enable their detection by LiDAR technology. The LiDAR detection can permit the proper function of autonomous vehicles by detecting a reflectance of the 905 nm and/or 1050 nm wavelengths transmitted from near IR lasers for LiDAR technology, while the coating composition retains the blackness typical from a carbon black IR absorbing pigment.

In one aspect of the present technology, the CuO portion of the nanoparticles can be of 50 nm or less such and the band gap is less than 1.7 eV, such as 1.2 to 1.6 eV. The size results from the synthesis of the nanoparticles by precipitation of $CuCO_3$ or $CuCO_3/Cu(OH)_2$ nanoparticles followed by the drying and subsequent calcining of the particles at temperature between about 300 and about 400° C. to decompose the $CuCO_3$ or $CuCO_3/Cu(OH)_2$ nanoparticles to CuO nanoparticles of less than 40 nm in cross-section to more than 10 μm in cross-section. Exemplary CuO nanoparticles are shown in the TEM images of FIGS. 4A-4C, where an aggregate particle of more than 6 μm (4A), where the aggregate nanoparticles are of less than about 40 nm (4B), and primarily particles of about 20 nm (4C).

In another aspect of the present technology, a method for preparing the nanoparticles is carried out by a precipitation method where an aqueous solution of $Cu(NO_3)_2$, or other highly soluble Cu(II) salt, such as $CuBr_2$, $CuCl_2$, $Cu(ClO_3)_2$, or $CuSO_4$, is combined with an aqueous solution of a precipitation agent that can be $Na_2CO_3$, $K_2CO_3$, $Li_2CO_3$, $Rb_2CO_3$, $Cs_2CO_3$, $Fr_2CO_3$, or any combination thereof. The basic precipitation agent can be added to the $Cu(NO_3)_2$ solution until the pH achieves a level of 9 to 10. Subsequent isolation of the resulting precipitate and washing with water results in effectively alkali nitrate and alkali carbonate free suspended solid $CuCO_3$ or $CuCO_3/Cu(OH)_2$ particles. The $CuCO_3/Cu(OH)_2$ particles are those with a $CuCO_3$, $Cu(OH)_2$, and mixed anion copper salt with $CO_3^{-2}$ and $OH^-$ anions, similar to malachite. After filtration and drying, aggregated $CuCO_3$ particles are ground into a fine powder appropriate for formulating a coating composition and calcined the particles at a temperature between about 300 and about 400° C. to form black CuO particles.

The washed $CuCO_3$ particles or $CuCO_3/Cu(OH)_2$ are dried. Drying can occur in air, under nitrogen, an inert atmosphere, an oxygen rich atmosphere, or under vacuum. Drying can occur at temperatures from ambient to about 120° C., depending upon the pressure employed during drying. The dried $CuCO_3$ containing particles can be ground to a fine or superfine powder. Grinding can be carried out in any mill appropriate for the hardness of the material. For example, the mill can be, but is not limited to, a ball mill, a jet mill, a high compression roll mill, a roll mill, or a universal mill. Subsequently, the dried particles are calcined at temperatures of between about 300 to 400° C. to convert the $CuCO_3$ containing particles to CuO containing particles that display a band gap of about 1.7 eV or less. As an alternative to the preparation of the particles by precipitation, the CuO particles can be formed from ground malachite, for example, using $CuCO_3$—$Cu(OH)_2$ (Sigma) where the calcining is carried out in the manner as described above for the $Na_2CO_3$ precipitated particles to yield LIDAR active black pigment of similar character. Hence, by proper calcining temperatures and the precursor composition, resulting black pigments can exhibit Blackness $M_y$ values greater than about 132.

The precipitation method, according to various aspects of the present technology, can be a deposition-precipitation method. The solution of $Cu(NO_3)_2$ can be combined with nanoparticles as a core material, such as, mica, synthetic mica, glass, quartz, or alumina to form a suspension upon which the $CuCO_3$ can be deposited upon reaction with the precipitation agent to form a shell. The shell can be continuous or discontinuous, for example, provided as islands of CuO on the core particle. Upon washing and calcining, the core-shell nanoparticles are those with a core covered or decorated by a CuO shell. In one aspect, the core is less than or equal to 10 μm in cross-section and the shell is less than 50 nm in thickness and can be a continuous or non-continuous shell. In another aspect, core particles can be equal to or less than 300 nm in cross-section with CuO surface features of less than 50 nm in dimension.

The precipitation or deposition-precipitation method can be carried out as a batch or continuous process for combination of the precipitant solution and the solution or suspension including the $Cu(NO_3)_2$. The slow addition of the basic precipitant solution can be carried out using at least one dropping funnel, or its equivalent, or at least one pump, where the profile of the addition is maintained to a desired rate, where the rate can be constant, accelerating, or deaccelerating, such that the quality and throughput of the precipitated $CuCO_3$ containing particles can be optimized. The appropriate agitation can be provided by at least one stirrer or other mixers. A continuous mixing loop can be constructed employing at least one active or passive inline mixer with a flow of the suspension through the loop. Alternately or additionally, mixing can be performed or augmented by cavitation that can be promoted by ultrasonic, piezoelectric, or other means.

After formation of the precipitated $CuCO_3$ or $CuCO_3/Cu(OH)_2$ containing particles, removal of the resulting aqueous solution from the particles can be carried out by filtration or centrifugation. A filtration can be performed by imposing a pressure on the particle proximal side of a filter or reducing the pressure on the particle distal side of the filter. Subsequently, the particles are washed to remove water soluble salts. The washing can be carried out in a batch manner, where the particles are suspended in a purified water and re-filtered or re-centrifuged; or the particles are washed in a continuous manner by flowing water through the filter bed or centrifuge bed. As needed, the water can be distilled water, ion-exchanged water, or reverse osmosis purified water.

Figure 5:
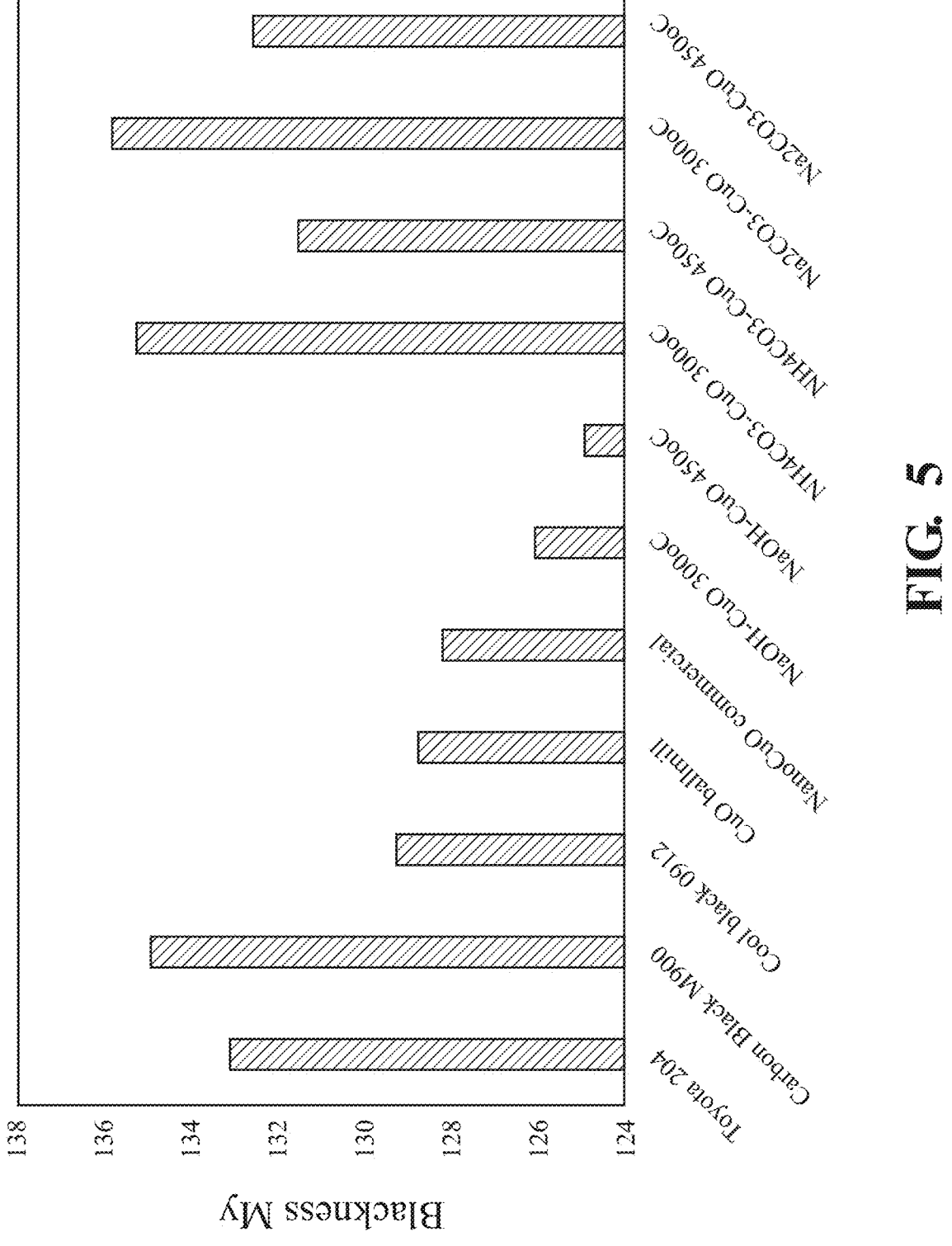
FIG. 5 shows a plot of Blackness $M_y$ values for a black touch-up paint, carbon black, a CuO based IR reflective paint (Cool black 0912), commercially available CuO variations, and precipitated and calcined CuO particles with various precipitating agents and calcining temperatures, including particles according to an aspect of the present technology.

The use of the alkali metal carbonate as the precipitation agent provides the small crystallite size of less than about 18 nm and the favorable (−111)/(111) ratio with the excellent blackness free of any significant visible light reflection when the calcining carried out to convert the carbonate/hydroxide particles to CuO particles is carried out at a temperature from about 300 to 400° C. Other precipitation agents do not provide the high-quality black IR reflective pigments, nor does milling or other means of reducing particle size, as is indicated in FIG. 5. As can be seen from the $M_y$ values in FIG. 5, the blackness required to assimilate the blackness of carbon black, as with the non-IR reflective touch-up paint, is not achievable from commercial CuO by milling or formed as nanoparticles from CuO. The precipitation method employed to achieve the present black pigment using $NaCO_3$ as the precipitant achieves sufficient blackness at 300° C. calcining but not at 450° C., and the use of ammonium carbonate as the precipitant gives a sufficient value when calcined at 300° C. calcining but not at 450° C., while the use of NaOH as the precipitant does not allow sufficient blackness. As illustrated in FIGS. 6A-6E, available commercial CuO (6E) gives poor blackness, as does NaOH precipitated $Cu(OH)_2$ that is calcined at 300° C. (6D). In contrast, black pigments formed using $CuCO_3$, from either sodium (6B) or ammonium carbonate (6C) precipitation, and calcined at 300° C. give black pigments similar to carbon black (6A), although the ammonium carbonate derived CuO has some red hue.

Figures 6A, 6B, 6C, 6D, 6E, 7A, 7B, 7C:
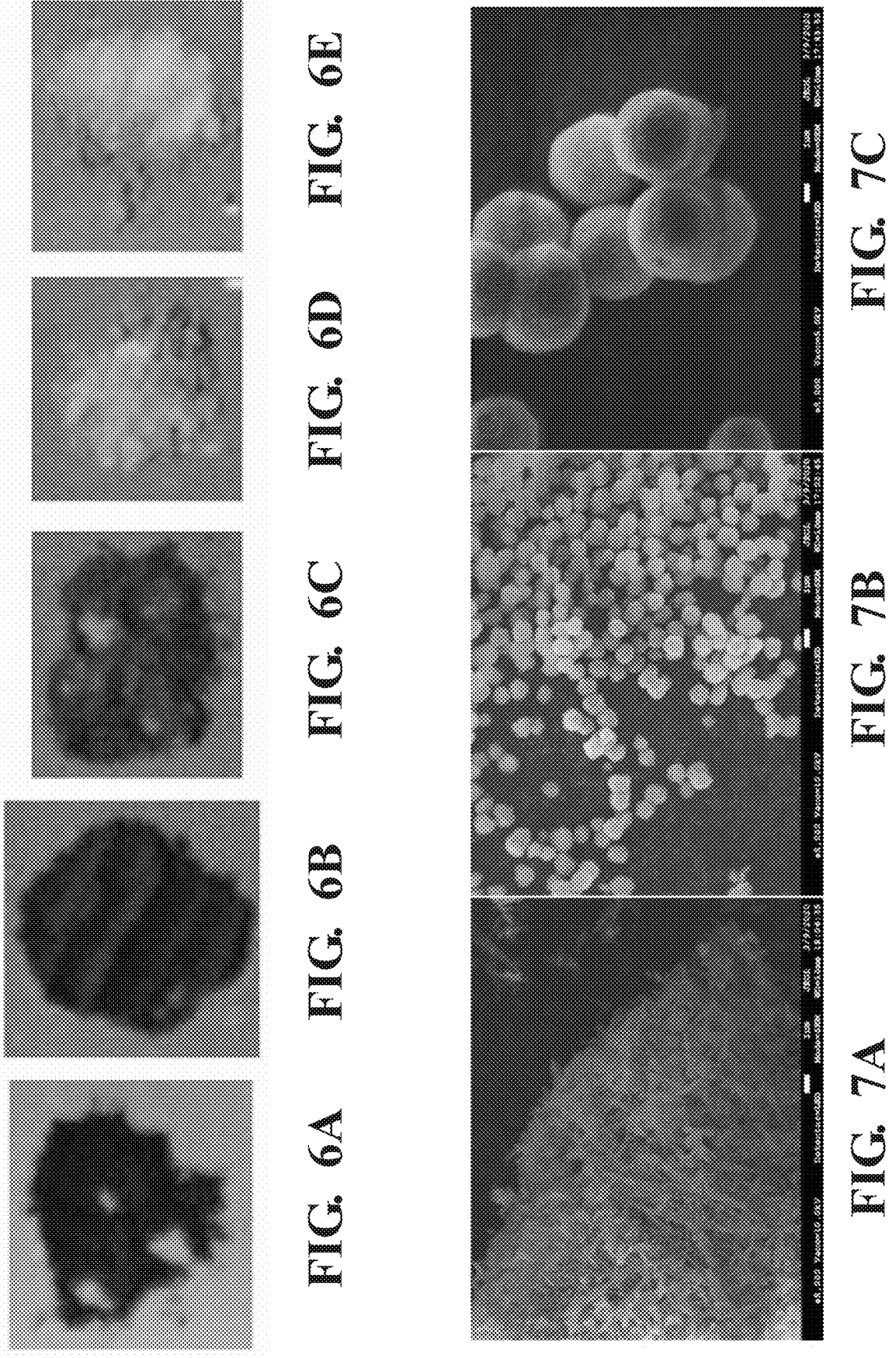
FIGS. 6A-6E are photographs from left to right of: carbon black (FIG. 6A); 300° C. calcined $Na_2CO_3$ precipitated CuO, according to an aspect of the present technology (FIG. 6B); 300° C. calcined $(NH_4)_2CO_3$ precipitated CuO (FIG. 6C); 300° C. calcined NaOH precipitated CuO (FIG. 6D); and commercial CuO powders (FIG. 6E).
FIGS. 7A-7C are X-ray microscopy images of: 300° C. calcined NaOH precipitated CuO (FIG. 7A); 300° C. calcined $(NH_4)_2CO_3$ precipitated CuO (FIG. 7B); and 300° C. calcined $Na_2CO_3$ precipitated CuO, according to an aspect of the present technology (FIG. 7C with the dimensional bar having a length of 1 µm.
Figure 8:
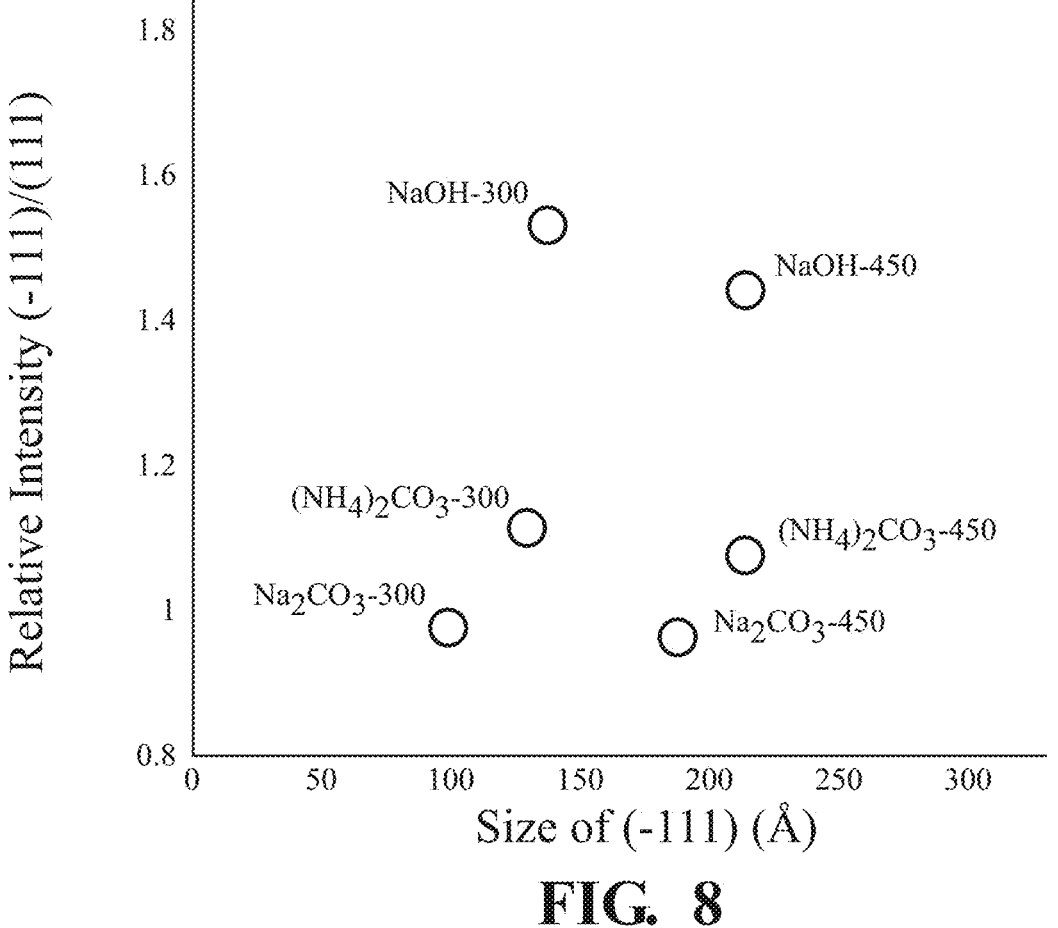
FIG. 8 is a plot of the relative intensities of the (−111)/(111) reflections for CuO particles formed with different precipitants and calcined at different temperatures as indicated therein.

The CuO formed by precipitation of $CuCO_3$ or $Cu(OH)_2$ display different morphologies and aggregate sizes depending on the precipitant that is used, as shown in FIGS. 7A-7C, where that formed from NaOH precipitation of $Cu(OH)_2$ displays agglomerated extended fibrils (7A), wherein discrete approximately spherical particles of CuO are formed from carbonates, although those from ammonium carbonate (7B) are of smaller dimensions than those from sodium carbonate (7C). Noting that the ammonium carbonate generated $CuCO_3$ leads to a slight red hue, it was discovered that the differences in the relative (−111)/(111) intensities and the crystallite size determined from the (−111) peak indicated that the best blacks had the smaller values of both features. As shown in FIG. 8, the superior black pigments were formed from the CuO that displayed the smaller values of (−111) size and relative (−111)/(111) intensities, where sufficient blackness was not achieved for particles that were greater than about 150 Å and about 1.2, respectively.

The temperature of calcining allows a black CuO at lower temperatures remaining nearly black when calcining the $CuCO_3/Cu(OH)_2$ at 400° C. but form a more brown CuO when calcined at 500° C., as shown in FIGS. 9A-9D. Although the relative intensity (−111)/(111) remains low, and decreases from the highest value for that calcined at 300° C., the crystallite size as measured by the size of the (−111), increases from about 15 nm when calcined at 400° C. to nearly 40 nm at 600° C., as shown in FIG. 10.

Figure 11:
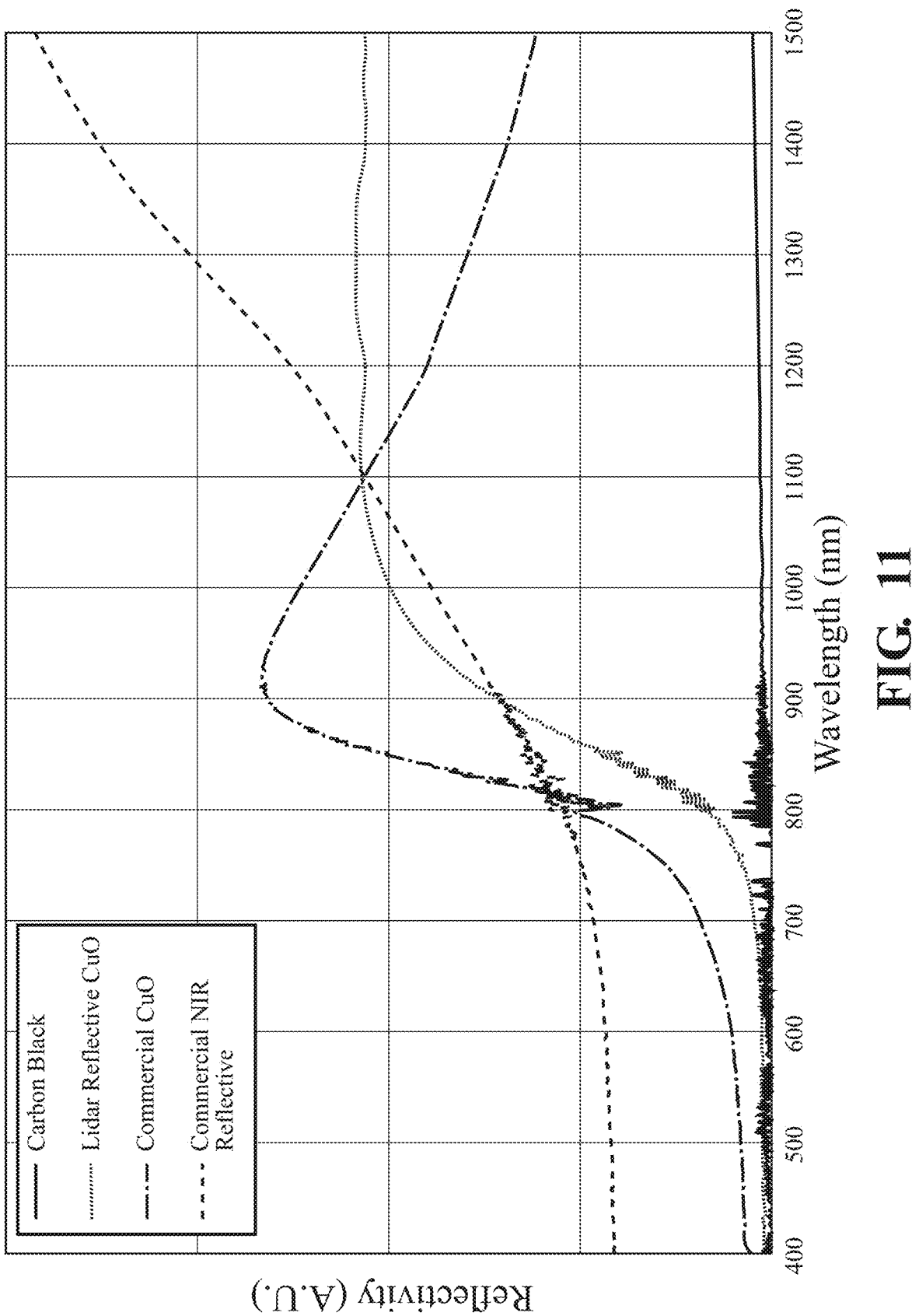
FIG. 11 is composite reflectance spectra for various coatings including carbon black, commercially available CuO, a common commercial NIR reflective coating, and a NIR reflective CuO, according to an embodiment.
Figures 12, 13:
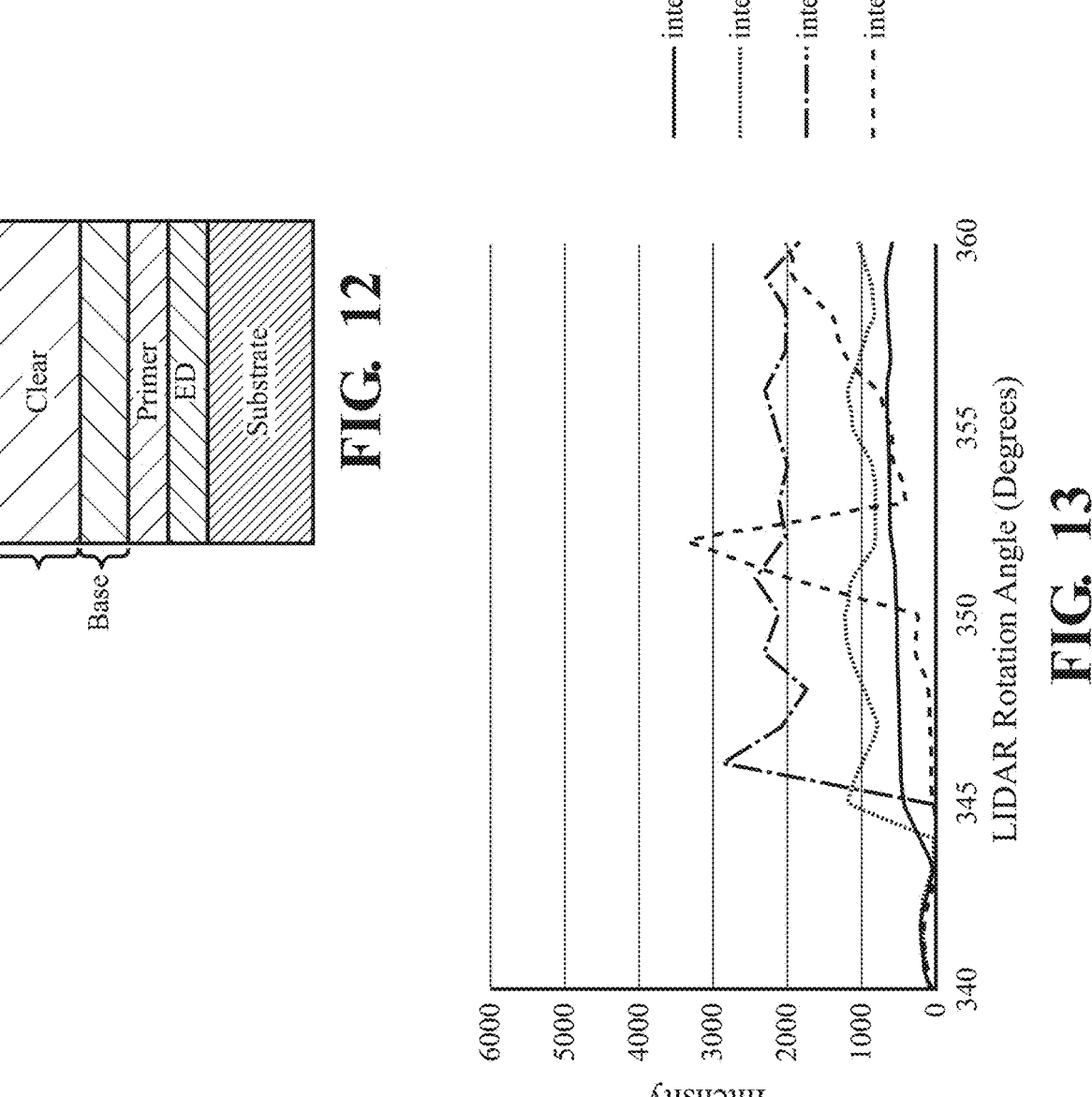
FIG. 12 is a cross-section of a schematic of a typical layered, painted substrate.
FIG. 13 is a plot of reflected intensities vs. rotational angle for LiDAR detection of a mirror, red pigment, green pigment, and a black pigment according to an aspect of the present technology.

The near IR reflective CuO containing particles can be formulated into coating compositions having spectral features like those illustrated in FIG. 11. These particles can be included in a water-based or oil-based formulation, such as a water based acrylic polyurethane enamel base coat. This black near IR reflective coating composition can be used as a base coat situated between a primer and clear coat of the finished body panel to which it is applied, as illustrated in FIG. 12. As shown in FIG. 13, the rotational angle for detection of the LiDAR surface with the black coating, according to an embodiment, though lower than developed green and red LiDAR coatings, is readily detected.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A black pigment with near IR transmitting and/or reflecting properties, the black pigment comprising a plurality of CuO crystallites with a maximum dimension of 18 nm or less, and a (−111)/(111) intensity ratio of less than 1.2, wherein the black pigment displays a band gap of 1.7 eV or less.

2. The black pigment according to claim 1, wherein the CuO crystallites are present on at least a portion of an outer surface of particles, and a diameter dimension of the particles is from about 50 nm to about 10 μm.

3. The black pigment according to claim 2, wherein the particles comprise a core portion comprising one of mica, synthetic mica, glass, quartz, or alumina.

4. The black pigment according to claim 3, wherein the portion of the outer surface comprising CuO has a thickness of less than about 50 nm.

5. The black pigment according to claim 3, wherein the portion of the outer surface comprising CuO is a continuous or a non-continuous shell on the core.

6. The black pigment according to claim 1, wherein the crystallites have a maximum dimension of 15 nm or less.

7. A coating composition, comprising: a fluid vehicle; and a black pigment with near IR transmitting and/or reflecting properties suspended in the fluid vehicle, wherein the black pigment comprises CuO crystallites with a maximum dimension of 18 nm or less, and a (−111)/(111) intensity ratio of less than 1.2, and wherein the coating composition displays a band gap of −1.7 eV or less.

8. The coating composition according to claim 7, wherein the CuO crystallites are present on at least a portion of an outer surface of particles, and the particles are 50 nm to 10 μm in cross-section.

9. The coating composition according to claim 8, wherein the particles comprise a core portion comprising one of mica, synthetic mica, glass, quartz, or alumina.

10. The coating composition according to claim 9, wherein the portion of the outer surface comprising CuO has a thickness of less than about 50 nm.

11. The coating composition according to claim 7, wherein the crystallites have a maximum dimension of 15 nm or less.

12. The coating composition according to claim 7, wherein the black pigment in the coating composition exhibits a Blackness $M_y$ value of at least 132.

13. A method for forming near IR reflecting or transmitting CuO crystallites, comprising:
   providing a solution or a suspension comprising a water-soluble Cu(II) salt;
   adding a precipitant solution comprising an alkali metal carbonate with the solution or the suspension to form a precipitate comprising $CuCO_3$;
   washing the precipitate with water;
   isolating the precipitate; and
   calcining the precipitate at a temperature between about 300 and about 400° C. to form the near IR reflecting or transmitting CuO crystallites, wherein the CuO crystallites have a maximum dimension of 18 nm or less, and a (−111)/(111) intensity ratio less than 1.2, wherein the CuO crystallites display a band gap of 1.7 eV or less.

14. The method according to claim 13, wherein the water-soluble Cu(II) salt comprises Cu $(NO_3)_2$.

15. The method according to claim 13, wherein the suspension comprises a suspension of core forming particles wherein the precipitate comprises a shell on the core forming particles.

16. The method according to claim 15, wherein the core forming particles comprise at least one of mica, synthetic mica, glass, quartz, or alumina.

17. The method according to claim 13, wherein the step of isolating the precipitate comprises filtering or centrifuging the precipitate, and the method further comprises drying the precipitate after isolating to form a dry precipitate.

18. The method according to claim 13, further comprising grinding the precipitate.

19. The method according to claim 13, further comprising grinding the near IR reflecting or transmitting CuO crystallites.

20. The black pigment according to claim 1, wherein the plurality of CuO crystallites form particle aggregates having a dimension of more than 6 μm.

21. The coating composition according to claim 7, wherein the CuO crystallites form particle aggregates having a dimension of more than 6 μm.

22. The method according to claim 13, wherein the CuO crystallites form particle aggregates having a dimension of more than 6 μm.

\* \* \* \* \*